(12) United States Patent
Chen et al.

(10) Patent No.: US 8,264,842 B2
(45) Date of Patent: Sep. 11, 2012

(54) DATA PROCESSING DEVICE AND MOTHERBOARD MODULE THEREOF

(75) Inventors: Kuang-Liang Chen, Taoyuan County (TW); Ting-Hao Wang, Taipei County (TW); Ching-Tsai Chang, Taipei County (TW); Yun-Ping Liu, Keelung (TW); Wen-Bin Tsay, Taipei (TW)

(73) Assignee: Elitegroup Computer Systems Co., Ltd., Neihu District, Taipei (TW)

( * ) Notice: Subject to any disclaimer, the term of this patent is extended or adjusted under 35 U.S.C. 154(b) by 288 days.

(21) Appl. No.: 12/749,523

(22) Filed: Mar. 30, 2010

(65) Prior Publication Data

US 2011/0242748 A1    Oct. 6, 2011

(51) Int. Cl.
*H05K 7/00*    (2006.01)

(52) U.S. Cl. .......................... 361/729; 361/752; 361/730

(58) Field of Classification Search .................. 361/796, 361/752, 728–730, 732, 800, 756
See application file for complete search history.

(56) References Cited

U.S. PATENT DOCUMENTS

| D292,698 | S | * | 11/1987 | DeVita et al. ................ D13/182 |
| 5,225,618 | A | * | 7/1993 | Wadhams ........................ 84/602 |
| D353,799 | S | * | 12/1994 | Speiser et al. ............... D13/182 |
| 5,530,620 | A | * | 6/1996 | Sangveraphunsiri .... 361/679.33 |
| 5,576,935 | A | * | 11/1996 | Freer et al. ..................... 361/785 |
| 5,748,912 | A | * | 5/1998 | Lee ................................. 710/301 |
| 5,815,371 | A | | 9/1998 | Jeffries et al. |
| 6,328,598 | B1 | * | 12/2001 | Harris, Jr. ....................... 439/516 |
| 7,149,093 | B2 | * | 12/2006 | Conway ........................ 361/788 |
| 7,672,141 | B2 | * | 3/2010 | Middleton et al. ............. 361/785 |

FOREIGN PATENT DOCUMENTS

| CN | 2556702 Y | 6/2003 |
| CN | 101089834 A | 12/2007 |
| CN | 201022034 Y | 2/2008 |
| TW | M306344 | 2/2007 |
| TW | M330523 | 4/2008 |
| TW | M337879 | 8/2008 |

* cited by examiner

*Primary Examiner* — Hung S Bui
(74) *Attorney, Agent, or Firm* — Winston Hsu; Scott Margo (57) ABSTRACT

The present invention discloses a data processing device and a motherboard thereof. The feature of the present invention is separating the motherboard thereof into two daughter boards. The first daughter board is fixed to the data processing device, and the second daughter board is connected to the first daughter board through a connector. The units that frequently be changed, such as a data processing component and data storing component, are disposed on the second daughter board. Besides, a hard disk signal bus of the data processing device, an optical disk drive signal bus, or a screen signal bus may be electrically connected to the first daughter board. As a result, when the data processing device is under maintenance or upgrade, the second daughter board can be removed without removing the casing, and also the plug-in and plug-out frequency of the connectors can be lower.

18 Claims, 7 Drawing Sheets

DATA PROCESSING DEVICE AND MOTHERBOARD MODULE THEREOF

FIELD

The present invention relates to a field of data processing device and motherboard module thereof. More specifically, the present invention relates to a data processing device and a motherboard module thereof, and both of which comprise easily removable units.

BACKGROUND

In the conventional manufacture of the portable computer, the mechanism design is mainly based on the electronic unit layout that defined by the predetermined formats in order to connect the related connecting line and module design to the motherboard, such as hard disk drive, optical disk drive, keyboard, and touch panel etc. Also, the motherboard is screwed on the base of the casing in traditional assembling process. Besides, the conventional motherboard has been installed in the casing first, and then the corresponding connecting lines and modules are assembled. Thus, if the motherboard is under the condition of replacement or maintenance, the entire casing must be dismantled before the removal of the motherboard. As a result, the maintenance becomes quite complicated and difficult, and the cost and time of maintenance are increasing accordingly. Moreover, the connecting lines used thereof are vulnerable for frequently plugging in and unplugging. Furthermore, if the user wants to take the entire casing apart, the portable computer might be easily damaged and the guarantee issue might be raised.

Besides, the input/output port (I/O port) is integrated into the exterior design of the portable computer. That is, the I/O port layout of the motherboard must is consistent with the appearance of the casing. Therefore, the motherboard in accordance with the casing must be designed separately, which increases the stocking and management cost.

SUMMARY

Whereas the long felt need of solving the abovementioned problems, an aspect of the present invention is providing a data processing device and a motherboard thereof in order to simplify the process of removal and replacement and to increase the compatibility of the motherboard.

Another aspect of the present invention is providing a data processing device and a motherboard thereof in order to lower the plug-in and plug-out frequency of the connecting lines of the data processing device during the dismantlement of the data processing device. The durability of the connecting lines can thus be extended.

According to another aspect of the present invention, a motherboard of the data processing device is provided. The data processing device comprises a casing, and the motherboard comprises at least one connector, a first daughter board, a second daughter board, a data processing component, a data storing component, and an input/output interface port. The first daughter board is disposed on and fixed to the casing, and the second daughter board is disposed in the casing and electrically connected to the first daughter board through the connector. Further, the data processing component is disposed on the second daughter board to process data and programs, and the data storing component is disposed on the second daughter board to store data and programs. Also, the input/output interface port is disposed on the first daughter board to connect to the peripheral devices of the data processing device.

In the aforementioned embodiment, the data processing device may be a desktop computer, a portable computer, a set to box (STB), a television, a portable communication device, a personal digital assistant (PDA), or a host of the audio device.

Further, the motherboard may comprise a chip set installed on the second daughter board to communicate with the peripheral devices of the data processing component and the data device. Also, a hard disk signal bus of the data processing device, an optical disk drive signal bus, or a screen signal bus may be electrically connected to the first daughter board, and the signals transmitted from the hard disk signal bus, the optical disk drive signal bus, or the screen signal bus are transmitted through the connector to the second daughter board.

According to another aspect of the present invention, a data processing device comprises a casing, at least one connector, a first daughter board, a second daughter board, a data processing component, a data storing component, and an input/output interface port. The casing comprises an assembling opening and a cover to mantle the assembling opening, and the first daughter board is disposed on and fixed to the casing. The second daughter board is disposed in the casing and electrically connected to the first daughter board through the connector. Also, the location of the second daughter board corresponds to the assembling opening so as to take out the second daughter board from the assembling opening. The data processing component is disposed on the second daughter board to process data and programs, the data storing component is disposed on the second daughter board to store data and programs, and the input/output interface port is disposed on the first daughter board to connect the peripheral devices of the data processing device.

In the aforementioned embodiment, the data processing device may be a desktop computer, a portable computer, a set to box (STB), a television, a portable communication device, a personal digital assistant (PDA), or a host of the audio device.

Further, the motherboard may comprise a chip set installed on the second daughter board to communicate with the peripheral devices of the data processing device and the data processing component. Also, a hard disk signal bus of the data processing device, an optical disk drive signal bus, or a screen signal bus is electrically connected to the first daughter board, and the signals transmitted from the hard disk signal bus, the optical disk drive signal bus, or the screen signal bus are transmitted through the connector to the second daughter board.

By the aforementioned aspects, the data processing device and the motherboard thereof in accordance with present invention have one or more following advantages:

(1) efficiently saving the maintenance time of assembly, removal, and replacement;
(2) minimizing the damage of the kits during the removal and maintenance of the motherboard;
(3) reducing the frequency of the plug-in and plug-out so as to minimize the damage of the connector;
(4) meeting the minimum requirement of electronic wires, simplifying the assembly procedure, and reducing the time consumption.

BRIEF DESCRIPTION OF THE DRAWINGS

The exemplary embodiments of the present invention will be understood more fully from the detailed description given

DETAILED DESCRIPTION

Exemplary embodiments of the present invention are described herein in the context of a data processing device and a motherboard thereof Those of ordinary skilled in the art will realize that the following detailed description of the exemplary embodiment is illustrative only and is not intended to be in any way limiting. Other embodiments will readily suggest themselves to such skilled persons having the benefit of this disclosure. Reference will now be made in detail to implementations of the exemplary embodiment as illustrated in the accompanying drawings.

Figure 1:
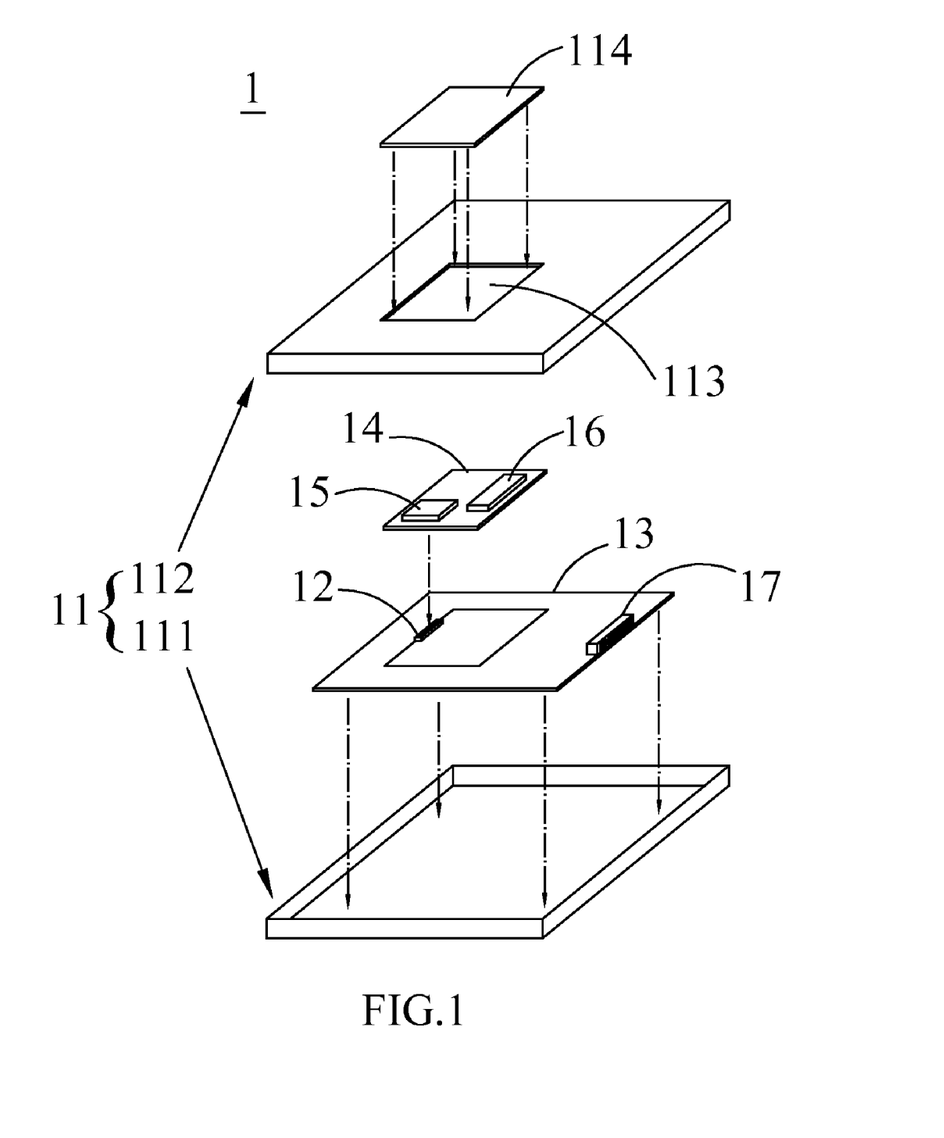
FIG. 1 illustrates an explosion view of a data processing device in accordance with the present invention.

Please refer to FIG. 1, which is an explosion view of a data processing device in accordance with the present invention. The data processing device 1 comprises a casing 11, at least one connector 12, a first daughter board 13, a second daughter board 14, a data processing component 15, a data storing component 16, an input/output interface port 17, and a cover 114. The casing 11 includes an upper casing 111 and a lower casing 112, the lower casing comprises an assembling opening 113, and the cover 114 is used for mantling the assembling opening 113. The data processing device 1 may be a desktop computer, a portable computer, a set to box (STB), a television, a portable communication device, a personal digital assistant (PDA), or a host of the audio device. For example, FIG. 1 is a schematic view that an upside down portable computer.

The first daughter board 13 is disposed on and fixed to the casing 11, and the input/output interface port 17 is disposed on the first daughter board 13 to connect to the peripheral devices of the data processing device 1. Also, a preferred embodiment, the input/output interface port 17 is exposed to the outside of the casing 11 and integrated with the design of the casing 11. The input/output interface port 17 may be a universal serial bus (USB) port, RS232 port, DY-I port, 1394 port, or internet connecting port etc.

The second daughter board 14 is disposed in the casing 11 and electrically connected to the first daughter board 13 through the connector 12. Also, the location of the second daughter board 14 corresponds to the assembling opening 113 so as to take out the second daughter board 14 from the assembling opening 113. The data processing component 15 is disposed on the second daughter board 14 to process data and programs, and the data processing component 15 is preferably a central process unit (CPU) or a microcontroller. Besides, the data storing component 16 is disposed on the second daughter board to store data and programs, and the data storing component 16 is preferably a volatile memory, such as Dynamic Random Access Memory (DRAM), or a non-volatile memory, such as a flash memory. The connector 12 may be a board to board connector.

Furthermore, other elements that usually under maintenance, replacement, or inspection also can be disposed on the second daughter board 14, such as a chip set installed on the second daughter board 14 to communicate with the peripheral devices of the data processing device 1 and the data processing component 15. As a result, when the user wants to maintain or upgrade the data processing device 1, the process to maintain and replace the elements is removing the cover 114, releasing the second daughter board 14 from the connector 12, and then removing the second daughter board 14 from the assembling opening 113. To ensure the security of the data processing device 1, the connecting strength of the upper casing 111 and the lower casing 112 as well as that of the first daughter board 13 and the casing 11 are higher than that of the cover 114 and lower casing 112 as well as that of the first daughter board 13 and the second daughter board 14. Thus, the elements of the data processing device 1 can be replaced without removing the casing 11 and the first daughter board 13. Therefore, the user can replace the elements of the data processing device easily without affecting the stability of the casing 11.

Moreover, if the data processing device 1 comprises a hard disk, an optical disk drive, or a screen, the hard disk signal bus, the optical disk bus, or the screen signal bus may be electrically connected to the first daughter board 13. Also the signals transmitted via the hard disk signal bus, the optical disk bus, or the screen signal bus are transmitted through the connector 12 to the second daughter board 14. In this way, the plug-in and plug-out frequency of the hard disk signal bus, the optical disk bus, or the screen signal bus can be reduced. If the hard disk signal bus, the optical disk signal bus, or the screen signal bus are connected to the second daughter board 14, the users must unplug the buses from second daughter board to remove the second daughter board. After the replacement, the buses need to be plugged in back to the second daughter board 14. However, in the present invention, the hard disk signal bus, the optical disk signal bus, and the screen signal bus are connected to the first daughter board 13. Thus, the users can replace elements only by releasing the second daughter board 14 from the connector 12. Due to the strength of the connector 12 is higher than the buses, the arrangement in the present invention can extend the service life of the data processing device 1.

Figure 2:
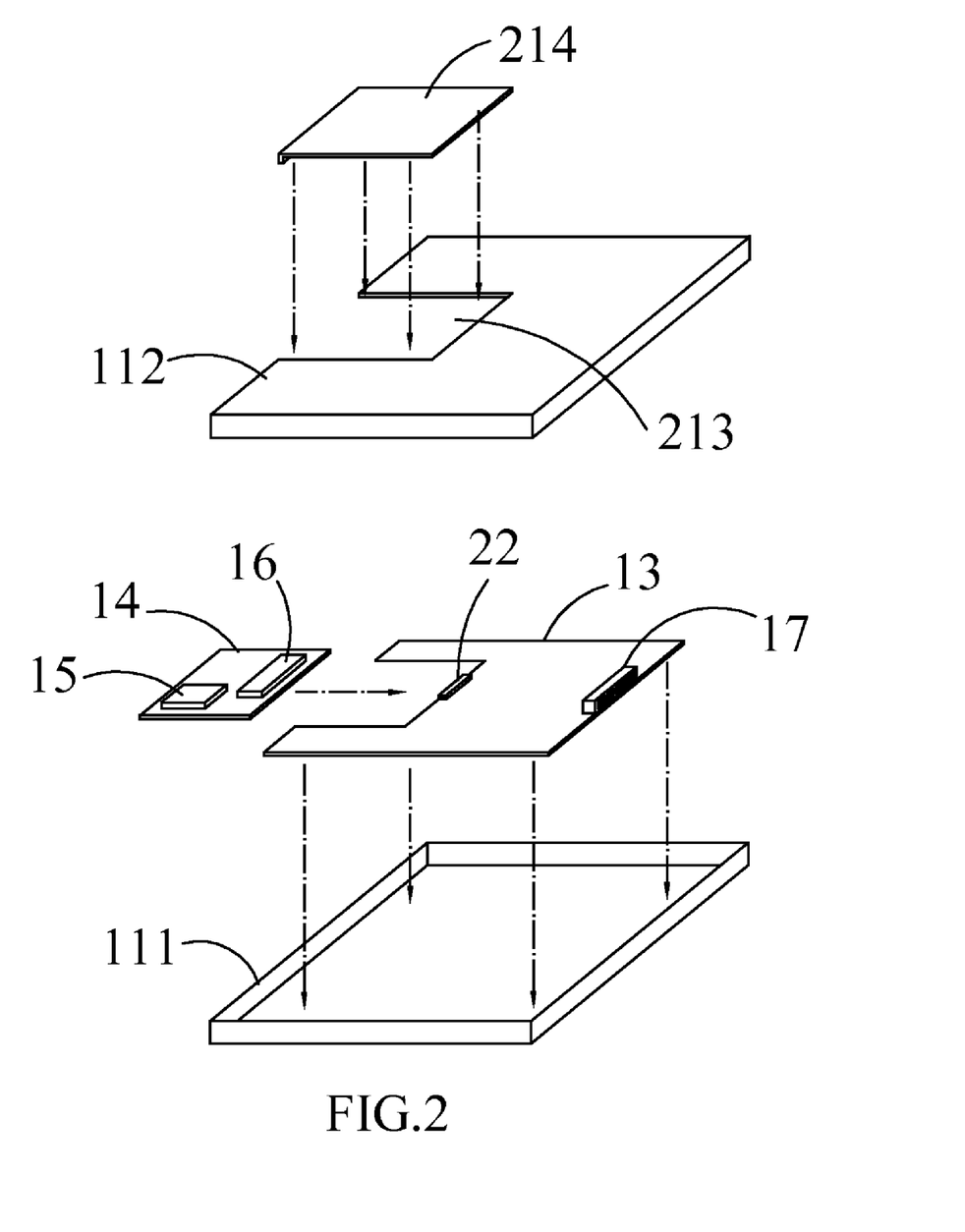
FIG. 2 illustrates an explosion view of a data processing device in accordance with the present invention.

Furthermore, the assembling opening may be a closed opening as shown in FIG. 1. The second daughter board 14 is inserted into or unplugged from the connector 12 lengthwise to connect to or release from the first daughter board 13. On the other hand, the assembling opening may be an opened opening as shown in FIG. 2. In FIG. 2, the cover 214 corresponds to the assembling opening 213, and the second daughter board 14 may be plugged in or unplugged from the connector 22 to connect to or release from the first daughter board 13. Besides, the data processing device 1 may comprise a guide pin or a guide track as required to assist the second daughter board 14 onto the first daughter board 13 and to minimize the damage of the connector 22, which causing by the positioning failure during plug-in and plug-out.

Figure 3:
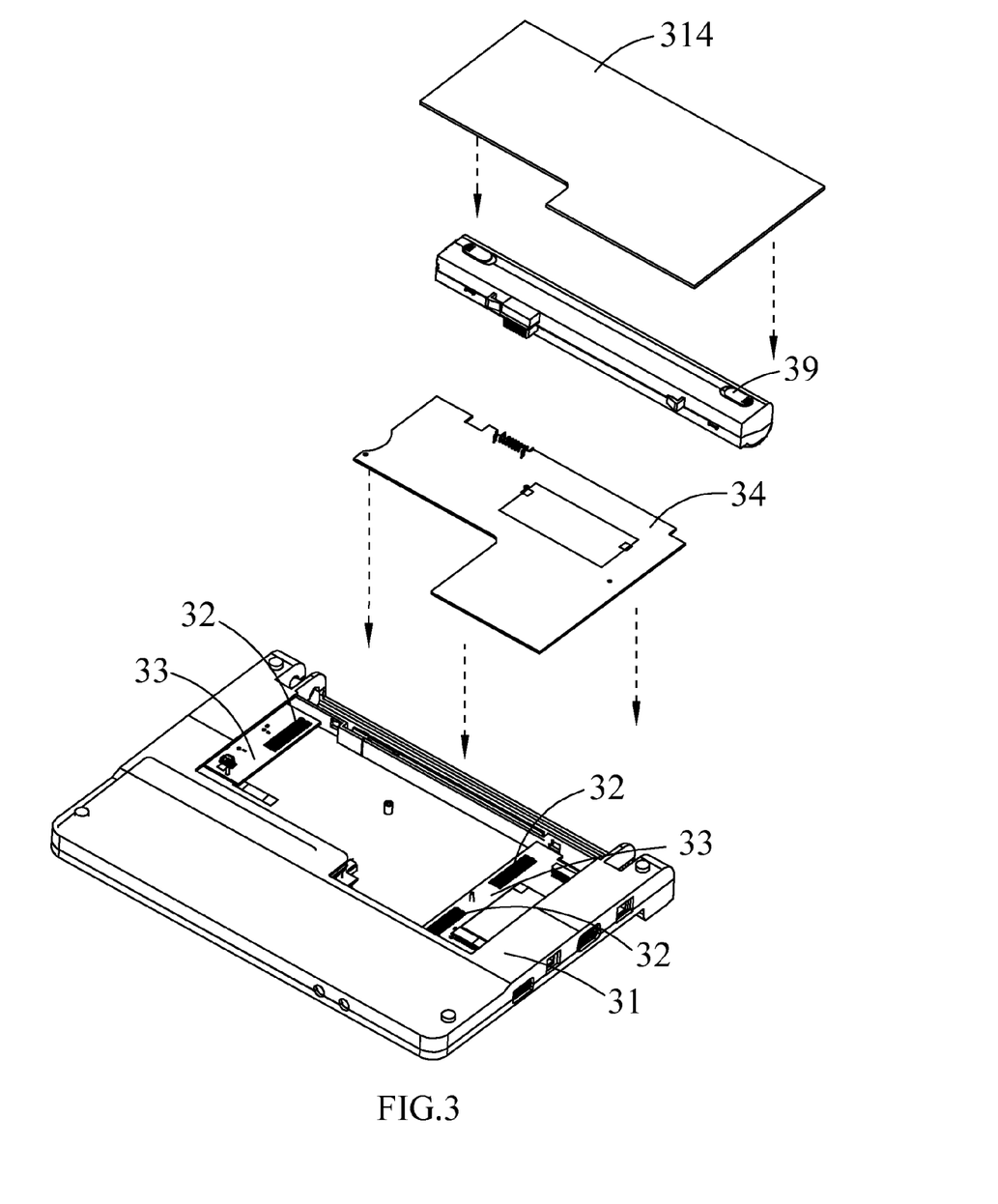
FIG. 3 illustrates a schematic view of a data processing device in accordance with the first embodiment of the present invention.
Figure 4:
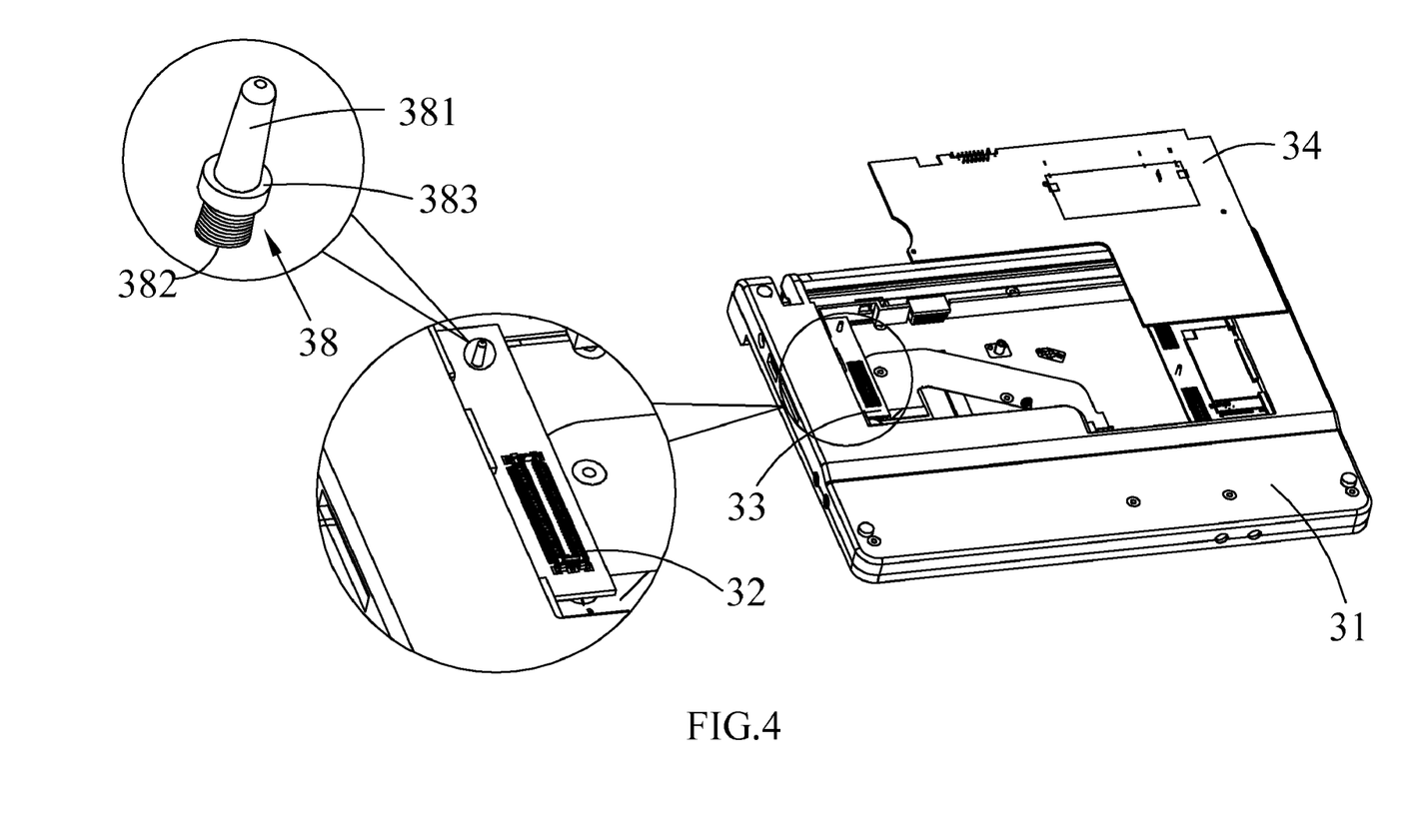
FIG. 4 illustrates a schematic view of a guide pin in accordance with the present invention.

Please refer to FIG. 3 and FIG. 4, which are the first embodiment of a data processing device and a guide pin thereof in accordance with the present invention. In FIG. 3 and FIG. 4, the data processing device is a portable computer 3 comprising a casing 31, at least one connector 32, a first daughter board 33, a second daughter board 34, a battery 39, and a cover 314. In FIG. 3, the first daughter board 33 has been assembled in the casing 31, and then the second daughter board 34 is electrically connected to the first daughter board 33. Lastly, the battery 39 is assembled and the cover 314 is installed. As a result, the portable computer 3 in accordance with the present invention can be obtained. Because the portable computer 3 is illustrated herein, the second daughter board 34 in this embodiment may be installed with a central process unit (CPU) and a Dynamic Random Access Memory (DRAM).

Please refer to FIG. 4 again, the portable computer 3 may comprise at least one guide pin 38, and the second daughter board 34 comprises holes corresponding to the guide pin 38. Further, the guide pin 38 is fixed to the first daughter board 33 or fixed to the casing 31 to be exposed from the holes corresponding to the first daughter board 33. When the second daughter board 34 is connected to the first daughter board 33, the holes on the second daughter board 34 may be pointed to the guide pin 38. In this manner, the second daughter board 34 can be inserted into the connector 32 so as to minimize the damage of the connector during the assembly of the second daughter board 34. In this embodiment, the guide pin 38 comprises an orientation pole 381, a stud bolt 382, and a fender 383. The orientation pole 381 is through the holes on the second daughter board 34, and the stud bolt 382 may be used for fastening the first daughter board 33 or the casing 31.

Figure 5:
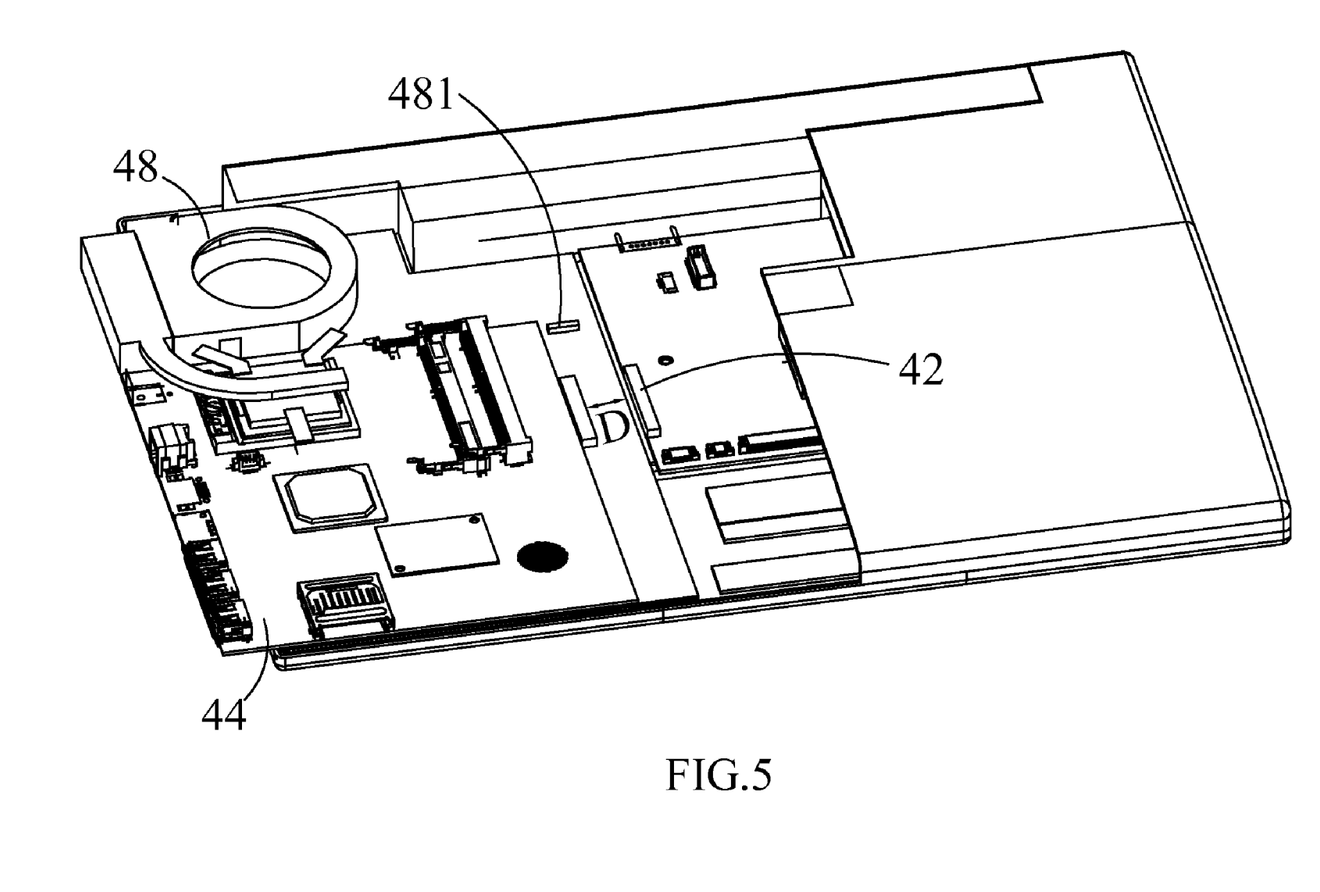
FIG. 5 illustrates a schematic view of a data processing device in accordance with the second embodiment of the present invention.

Please refer to FIG. 5, which illustrates a schematic view of a data processing device in accordance with the second embodiment of the present invention. In FIG. 5, the data processing device is also a portable computer, however, the difference between the first embodiment and the second embodiment is that the second daughter board 44 is inserted into or removed from the connector 42 laterally (as the D direction shown in FIG. 5). Besides, the second embodiment further comprises a heat sink module 48 and a guide track 481. The heat sink module 48 connects the second daughter board 44 in order to be disposed in the portable computer together, and the second daughter board 44 may move along the guide track 481 to be inserted into the connector 42 more precisely.

Figure 6:
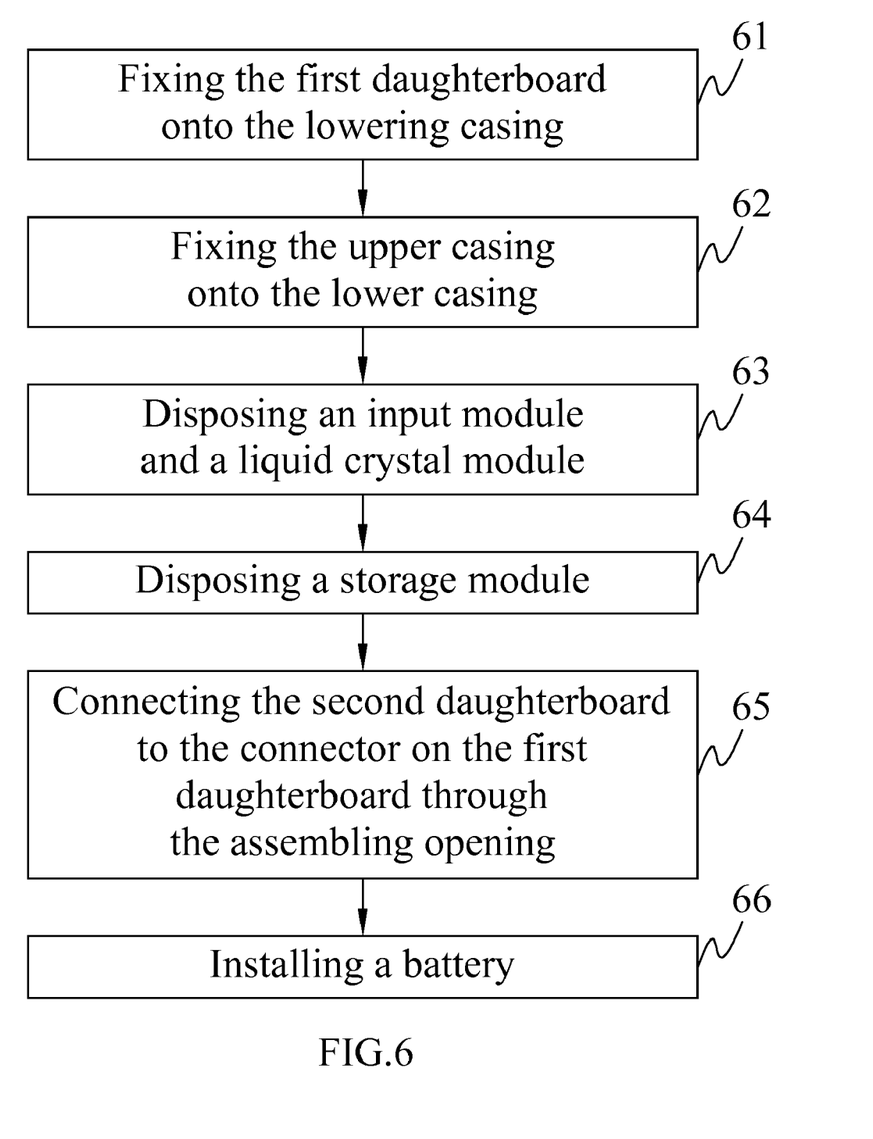
FIG. 6 illustrates an assembly flow chart of a data processing device in accordance with the first embodiment of the present invention.

Please refer FIG. 6, which illustrates an assembly flow chart of a data processing device in accordance with the first embodiment of the present invention. In FIG. 6, the data processing device is a portable computer comprising an upper casing, a lower casing, a cover, a liquid crystal module, at least one storage module, an input module, a battery, a first daughter board, and a second daughter board. Also, the lower casing comprises at least one assembling opening, and the cover is used for mantle the assembling opening. The description of the first daughter board and the second daughter board, which has been mentioned in the above paragraphs, is skipped herein. The storage module is a hard disk or an optical disk drive, and the input module comprises a keyboard or a touch panel. In step 61, the first daughter board is fixed onto the lower casing; in step 62, the uppercasing is fixed onto the lower casing; in step 63, the input module and the liquid crystal module are disposed; and in step 64, the storage module is installed. The signal buses of the liquid crystal module and the storage module are preferably connected to the first daughter board. In step 65, the second daughter board connects to the first daughter board through the assembling opening; and in step 66, a battery is installed.

Because the first daughter board is fixed onto the lower casing, the users can maintain or upgrade the portable computer by removing the second daughter board. Moreover, the size of the first daughter board is preferably corresponding to the size of the casing (the upper casing and the lower casing) of the portable computer. Thus, when the manufacturer would like to produce portable computer with different sizes, the only thing need to do is designing different sizes of the casing and the corresponding first daughter boards. That is, all the first daughter boards can be used with the second daughter board that having the same size. Furthermore, through the aforementioned step 61 to step 64, the semi-product of the portable computer with varying sizes can be manufactured. Thus the proper second daughter board can be inserted as client's demand at the point of sale in order to obtain a well-assembled portable computer. In this way, the stocking in the producer and the retailer can be more flexible, and also the second daughter board with varying functions can be inserted on client's demand, such as CPU with different specifications.

Figure 7:
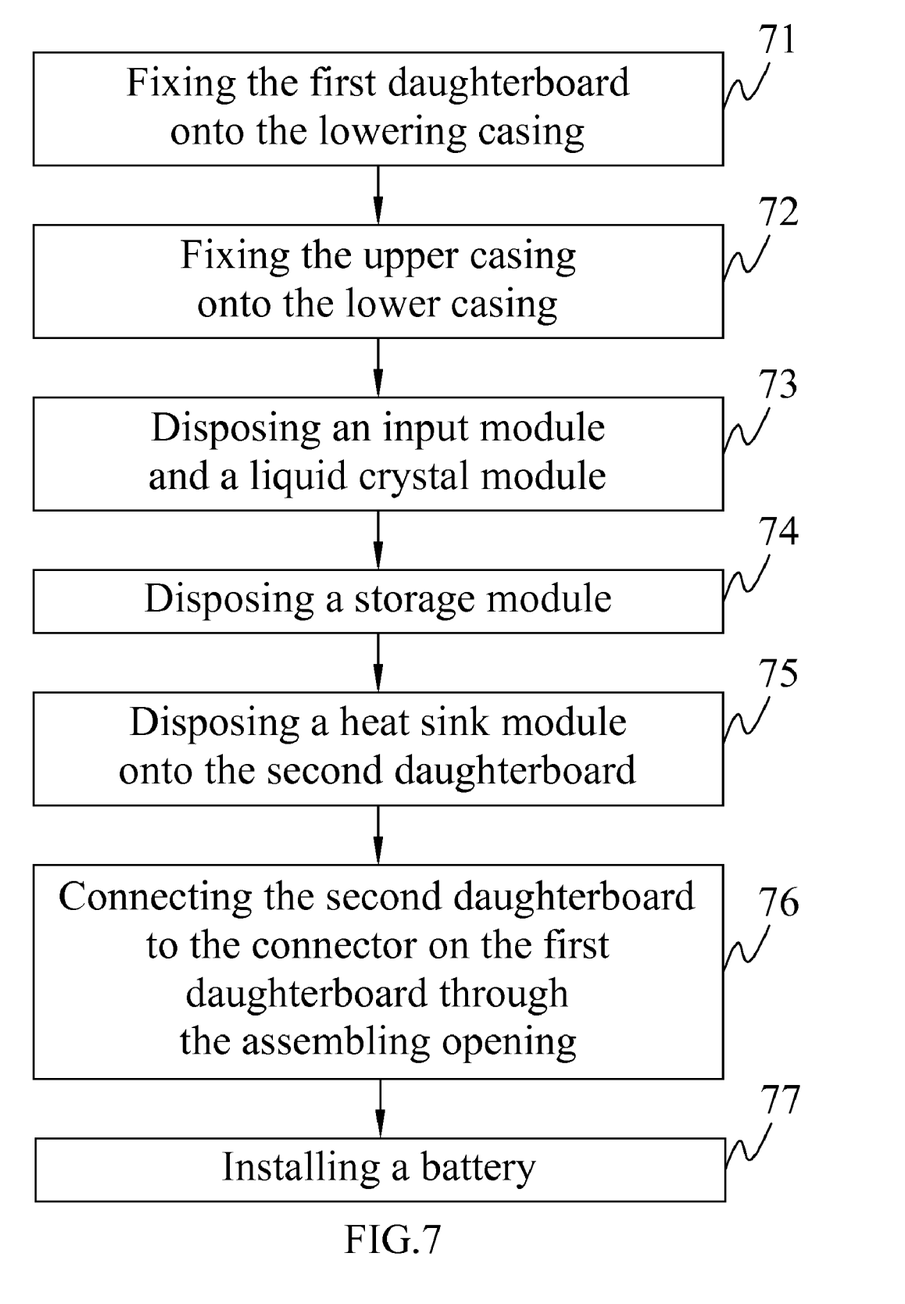
FIG. 7 illustrates an assembly flow chart of a data processing device in accordance with the second embodiment of the present invention.

Please refer to FIG. 7, which illustrates an assembly flow chart of a data processing device in accordance with the second embodiment of the present invention. In FIG. 7, the difference between the first embodiment and the second embodiment is that the second embodiment comprises a heat sink module. In step 71, the first daughter board is fixed onto the lower casing; in step 72, the uppercasing is fixed onto the lower casing; in step 73, the input module and the liquid crystal module are disposed; and in step 74, the storage module is installed. The signal buses of the liquid crystal module and the storage module are preferably connected to the first daughter board. In step 75, the heat sink module is installed on the second daughter board; in step 76, the second daughter board connects to the first daughter board through the assembling opening; and in step 77, a battery is installed.

Moreover, the heat sink module also may be disposed onto the second daughter board after the second daughter board is disposed onto the first daughter board. While the portable computer is taken as an embodiment herein, the scope of the present invention is not limited thereto. A desktop computer, a set to box (STB), a television, a portable communication device, a personal digital assistant (PDA), or a host of the audio device also can be used herein.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiments of the present invention.

What is claimed is:

1. A motherboard of a data processing device comprising a casing, comprising:
   at least one connector;
   a first daughter board disposed on and fixed to the casing, wherein the first daughter board has an opening and the connector is disposed on a region of the first daughter board, wherein the region is direct connected to a side of the opening;
   a second daughter board disposed on the casing and electrically connected to the first daughter board through the at least one connector, wherein the second daughter board is identical to the opening in size;
   a data processing component disposed on the second daughter board to process data and programs;

a data storing component disposed on the second daughter board to store data and programs; and an input/output interface port disposed on the first daughter board to connect peripheral devices of the data processing device.

2. The motherboard of a data processing device as claimed in claim 1, wherein the data processing device is a desktop computer, a portable computer, a set to box (STB), a television, a portable communication device, a personal digital assistant (PDA), or a host of the audio device.

3. The motherboard of a data processing device as claimed in claim 1, further comprising a chip set disposed on the second daughter board and communicating with the peripheral devices of the data processing component and the data processing device.

4. The motherboard of a data processing device as claimed in claim 1, wherein the a hard disk signal bus of the data processing device, an optical disk drive signal bus, or a screen signal bus is electrically connected to the first daughter board, and the signals transmitted from the hard disk signal bus, the optical disk drive signal bus, or the screen signal bus are transmitted through the connector to the second daughter board.

5. The motherboard of a data processing device as claimed in claim 1, further comprising a heat sink module disposed on the second daughter board.

6. The motherboard of a data processing device as claimed in claim 1, wherein the size of the first daughter board is corresponding to the size of the casing.

7. The motherboard of a data processing device as claimed in claim 1, wherein the first daughter board comprises at least one guide pin to position the second daughter board.

8. The motherboard of a data processing device as claimed in claim 1, wherein the first daughter board further comprises at least one guide track to insert the second daughter board into the at least one connector along the at least one guide track.

9. A data processing device comprising
a casing comprising an assembling opening and a cover to mantle the assembling opening;
at least one connector;
a first daughter board disposed in and fixed to the casing, wherein the first daughter board has an opening and the connector is disposed on a region of the first daughter board, wherein the region is direct connected to a side of the opening;
a second daughter board disposed on the casing and electrically connected to the first daughter board through the at least one connector, wherein the second daughter board is identical to the opening in size; wherein the location of the second daughter board corresponds to the assembling opening to remove the second daughter board from the assembling opening;
a data processing component disposed on the second daughter board to process data and programs;
a data storing component disposed on the second daughter board to store data and programs; and
an input/output interface port disposed on the first daughter board to connect peripheral devices of the data processing device.

10. The data processing device as claimed in claim 9, wherein the data processing device is a desktop computer, a portable computer, a set to box (STB), a television, a portable communication device, a personal digital assistant (PDA), or a host of the audio device.

11. The data processing device as claimed in claim 9, further comprising a chip set disposed on the second daughter board and communicating with the peripheral devices of the data processing component and the data processing device.

12. The data processing device as claimed in claim 9, further comprising a screen and a screen signal bus electrically connected to the screen and the first daughter board, wherein the signals transmitted from the screen signal bus are transmitted through the at least one connector to the second daughter board.

13. The data processing device as claimed in claim 9, further comprising a hard disk and a hard disk signal bus electrically connected to the hard disk and the first daughter board, wherein the signals transmitted from the hard disk signal bus are transmitted through the at least one connector to the second daughter board.

14. The data processing device as claimed in claim 9, further comprising an optical disk and an optical disk signal bus electrically connected to the optical disk and the first daughter board, wherein the signals transmitted from the optical disk signal bus are transmitted through the at least one connector to the second daughter board.

15. The data processing device as claimed in claim 9, further comprising a guide pin to position the second daughter board.

16. The data processing device as claimed in claim 9, wherein the motherboard further comprises at least one guide track to insert the second daughter board into the at least one connector along the guide track.

17. The data processing device as claimed in claim 9, further comprising a heat sink module disposed on the second daughter board.

18. The data processing device as claimed in claim 9, wherein the size of the first daughter board is corresponding to the size of the casing.

* * * * *